Figure 1:
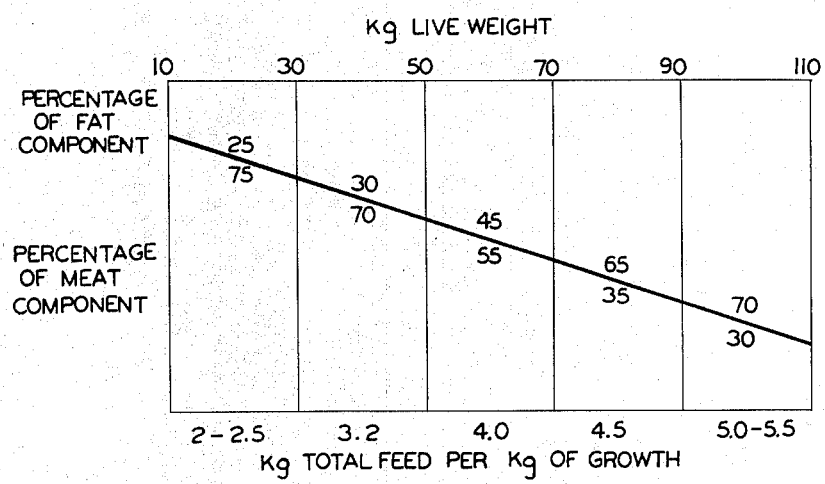

Dec. 7, 1965    S. SCHÖNER    3,222,179

FEED ADDITIVE CONTAINING RENNET AND CALCIUM CHLORIDE

Filed Dec. 21, 1961

INVENTOR
STEFAN SCHÖNER

3,222,179
FEED ADDITIVE CONTAINING RENNET AND CALCIUM CHLORIDE
Stefan Schöner, Munich, Germany, assignor to Aktiengesellschaft Fuu, Schaan, Liechtenstein, a corporation of Liechtenstein
Filed Dec. 21, 1961, Ser. No. 161,142
Claims priority, application Germany, Dec. 21, 1960, A 36,339
1 Claim. (Cl. 99—2)

The present invention relates to a material for use as an additive to animal feed for improving the efficiency thereof.

It is an object of the invention to provide a material of the above-mentioned kind which when added to animal feed either of an animal or vegetable origin will improve the utilization or activation of the proteins and nitrogen-free components, particularly carbohydrates contained in the feed and of which heretofore the animal organism has not been able to make sufficient use.

The advantages of this material, which will be subsequently described in detail, are primarily a considerable saving in feed, a reduction in the time required for force-feeding and fattening the animals, and an improvement in the meat component relative to the fat component of the animals. These advantages have been determined especially by long-range test series on pigs.

The feed additive according to the invention consists of substances, primarily rennet, which have a fermenting effect and contain calcium ions. Although other ferments, for example, papain and pepsin have proved suitable for this purpose, the invention will hereafter be described primarily with reference to rennet.

For attaining the objects and advantages of the invention, the rennet is mixed with calcium compounds. In view of the fact that this mixture, i.e. the feed additive according to the invention, improves the utilization of the feed by the animal, it will hereafter be called "activated rennet."

The use of this term is justified by the observations which have so far been made according to which protein carriers of a vegetable or animal origin, for example, fish or meat meal or the like, in combination with rennet alone, that is, with unactivated rennet, do not show any improvements in the growth of the animals.

Calcium compounds which have proved successful are, for example, calcium chloride, calcium acetate, calcium lactate, and calcium citrate. If these materials are employed as substances for activating the rennet, considerable improvements will be attained over the addition of rennet alone to the feed. Especially valuable for this purpose have proved to be calcium chloride and calcium acetate. The well-known strong hygroscopicity of calcium chloride does not have any detrimental effect upon the present composition because the inventive additive only constitutes a small component of the feed. The additive is mixed so intimately with the feed that the moisture which is caused by the hygroscopicity is so uniformly distributed within the large mass of the feed that no difficulty will even occur when the feed is stored. Obviously, the hygroscopic property has practically no effect when the additive is added to liquid fodder or swill or to the water, milk, or other drinking liquid.

The content of the feed additive according to the invention in rennet may vary within wide limits relative to the content in calcium compound or in calcium ion.

The amount of the activated rennet which is added to the feed depends to a certain extent upon the age of the animal to be raised or fattened. As a general rule, the amount of the additive is slightly increased in accordance with the age of the animal. Only a relatively small amount of it needs to be added to the feed; amounts even as small as 100 g. of activated rennet per 100 kg. of feed will result in the desired fattening and it has even been found that amounts of only 50 g. of activated rennet per 100 kg. of feed are quite successful. In some cases it is advisable to apply larger amounts, for example, if the feed is to be given to older animals or if it is partly composed of substances which are difficult to decompose. In such cases it may be advisable to increase the content in additive up to 200 g. per 100 kg. of feed. If still greater amounts are added, the beneficial results attained are no longer as favorable in comparison to the cost involved.

Insofar as the proportion of rennet to the amount of substance to be activated is concerned, it has been found that, when employing calcium chloride, a proportion of 1 to 5 leads to excellent results.

As already state, the amounts of activated rennet may vary. With a mixture of rennet and calcium chloride at a proportion of 1 to 5, amounts of 100 to 150 g. per 100 kg. of feed and with a mixture of rennet and calcium acetate at a proportion of 1 to 7, amounts of 140 to 200 g. per 100 kg. of feed have proved to be very successful.

As compared with calcium chloride and calcium acetate, other calcium compounds, for example, the above-mentioned calcium lactate and calcium citrate, are less active. If the effective value of the activity of calcium chloride or calcium acetate is set to be 100%, calcium lactate only has a value of 70% and calcium citrate one of about 55 to 60%, apart from the fact that for attaining these values, which may also be regarded as the degrees of efficiency, about 300% more of calcium lactate or up to 400% of calcium citrate are required in the rennet mixture per 100 kg. of feed.

The advantage that, when applying the novel additive to the feed, the fat component may be reduced in favor of the meat component will be evident from the following. In earlier times, there was a need to raise fat hogs since the hog was then the principal source of fat which was required for human food consumption. In those times, the methods of fat hardening, now practiced for a long time, were still unknown. Vegetable fats had also not as yet acquired their present importance. Since fat for human consumption is now primarily supplied by vegetable fats, the importance of the fat from hogs has decreased considerably. The present general tendency of hog breeders is therefore to breed meat hogs.

Experience has shown that the beeding of meat animals requires a higher-grade feed than that of fat animals. This will be briefly explained with reference to hogs. When breeding hogs, it is first necessary to feed them a fodder which is quite rich in protein so that the live weight of a growing hog of, for example, 50 kg., may be increased to 100 kg. During this growing period, muscle-meat, bones, skin, and intestines are primarily formed. Thereafter, when the actual growth is completed, the fat component increases considerably.

Since the modern aim of breeding is primarily directed toward meat hogs, it is of great importance to provide suitable means which permit a saving in the high-grade protein fodder which is required for this purpose. This is achieved by the feed additive according to the invention. It has, however, also the advantage that, if the hogs are to be further fattened to increase their weight and fat component, considerable savings will also be made in the then necessary fodder which is rich in carbohydrates. These savings will become clearly apparent from the following brief example.

For increasing the live weight of a hog by 1 kg., approximately 3.5 kg. of fodder may be required with a total content in nutritive substances of about 2.4 kg. When adding the additive according to the invention to the fodder, the formation of a live weight of 1 kg. only requires 2.5 kg. of fodder with a total content in nutritive substances of 1.7 kg. Thus, there is a saving of 0.7 kg. in nutritive substances which are composed of protein and substances which are free of nitrogen (carbohydrates). This may be better understood when considering that the proportion of protein to starch in the breeding of hogs amounts to about 1 to 3.5 to 1 to 4.5. This shows clearly that the application of the feed additive also results in a considerable saving in carbohydrates.

For producing an increase of 1 kg. in live weight, an average of 4.5 kg. of feed with a grain base and protein additions are required. Smaller amounts of feed, for example, about 3.5 kg., are required for ready-made feed as supplied by the feed industry. The invention permits the reduction of the average consumption in feed for an increase of each kg. in live weight to an amount of only 2.2 to 2.5 kg. of feed. These results have been attained, for example, in a large number of tests on hogs which were fed fodder mixtures of a good quality to which the material according to the invention was added. The following tables illustrate these results with reference to the breeding of different kinds of animals:

1. HOGS

A. *Normal fodder of a good quality with a total content in nutritive substances of, for example, 700 to 750 g. per kg. without the inventive additive*

| Live weight (in kg.): | Amount of fodder (in g. per day) |
|---|---|
| 10 | 450 |
| 20 | 900 |
| 30 | 1400 |
| 40 | 1850 |
| 50 | 2100 |
| 60 | 2400 |
| 70 | 2700 |
| 80 | 3000 |
| 90 | 3150 |
| 100 | 3350 |
| 110 | 3500 |

With the above conventional feeding, the normal feeding period for producing an increase of 100 kg. in live weight amounts to 130 to 180 days. The total amount of fodder required for an increase of 100 kg. in live weight then lies between 300 kg. in the most favorable case and 450 kg. in the most unfavorable case.

B. *Normal fodder as in A with the additive according to the invention*

| Live weight (in kg.): | Amount of fodder (in g. per day) |
|---|---|
| 10 | 300 |
| 20 | 650 |
| 30 | 850 |
| 40 | 1000 |
| 50 | 1200 |
| 60 | 1500 |
| 70 | 1750 |
| 80 | 1900 |
| 90 | 2000 |
| 100 | 2200 |
| 110 | 2300 |

According to the tests which have so far been carried out, the normal feeding period in the case of table B amounts to 110 to 150 days. The total amount of fodder required for an increase of 100 kg. in live weight lies according to the tests between about 160 kg. in the most favorable case and about 260 kg. in the most unfavorable case.

A comparison of the results according to tables A and B shows that, when applying the feed additive according to the invention, a saving of about 40% and more in fodder will be attained.

Furthermore, it has been found that with a fodder containing the inventive additive, the animals are very quickly satisfied which means that considerably smaller amounts of fodder are required than by the usual fodder. The tests in which the above results were found also showed that the meat component was increased and the fat component was reduced.

2. POULTRY

A. *Fat chicken*

For producing an increase of 1 kg. in the live weight of a chicken, 2.2 to 2.8 kg. of a ready-made, industrially prepared chicken feed were used. Similar feed mixtures with the additive according to the invention (rennet to calcium chloride at a ratio of 1 to 5 and with 150 g. of this mixture per 100 kg. of feed) resulted in the tests in a consumption of only 1.25 kg. of feed and in some cases in one of only 1 kg. of feed per each kg. of increased live weight. The force-feeding period with poultry feed amounted to 56 days which resulted in a live weight of each animal of 1000 to 1250 g. The same results were attained in the tests in only 45 days when the feed additive according to the invention was applied. This means a saving in feed of 50% and more and a reduction of the force-feeding period of about 20%.

B. *Laying hens*

For simplicity's sake and for economic reasons, laying hens are today also mostly fed with an industrially manufactured feed. The consumption of feed by a laying hen generally amounts to 115 to 140 g. per day. If the same feed which was mixed with the additive according to the invention was fed, the daily average consumption amounted to only 90 to 105 g. Furthermore, the laying activity of the hens increased by about 10%. This means a saving in feed of about 30 to 35% per each egg laid.

In these tests the same amount of feed additive was applied as in the raising of fat chicken.

The simplest manner of applying the additive appears to be by mixing it into the feed. However, it is also possible to dissolve it in the water or other drinking liquid.

3. MILK-FED CALVES

For producing an increase of 1 kg. in live weight, 13 kg. of skimmed milk are generally required. When applying rennet alone as an addition to the milk, the amount of milk could be reduced from 13 kg. to 11 kg. When the inventive feed additive containing calcium chloride or calcium acetate and the same amount of rennet was added to the milk, the amount of milk required could be reduced from 13 kg. to 8 kg. With rennet alone, only 15% and with the inventive feed additive about 40% of milk were saved.

Concerning all of the above results, it may be added that they were attained with very healthy animals and with proper treatment, and under proper stable and other surrounding conditions.

The inventive feed additive may be employed in different manners. Thus, for example, it is possible to add the additive to ready-made feed in quantities which depend upon the respective kinds of animals. It may also be mixed with protein feed (albumin concentrates) which is industrially produced and is then mixed into the feed. Furthermore, it may be added directly into the feed or into the drinking liquid. Since the amounts of additive which are applied are very small, they should, however, be carefully measured since the desired success will otherwise not be attained. Finally, the feed additive may also be fed in suitable premixtures with appropriate filling feed agents, ready-made feed mixtures, and the like.

The feed additive according to the invention is produced by mixing the calcium compounds in suitable mixing apparatus with pulverized rennet in the mentioned proportions or with further suitable ferments, such as papain, pepsin, and the like.

In order to be more easily applied and to insure a very uniform distribution of the additive in the feed mixtures in the event that adequate mixing apparatus are not available, it is also possible to mix them with carrier substances, such as Indian corn, grain, milling products, or the like. Such mixtures may also be applied as additions to truck crops and silage. They may also be added to truck crops and green fodder while the latter are being preserved in green-fodder containers.

In order to explain the invention still more clearly reference is made to the accompanying graphs which indicate the test results of hog breeding, and in which—

Figure 2:
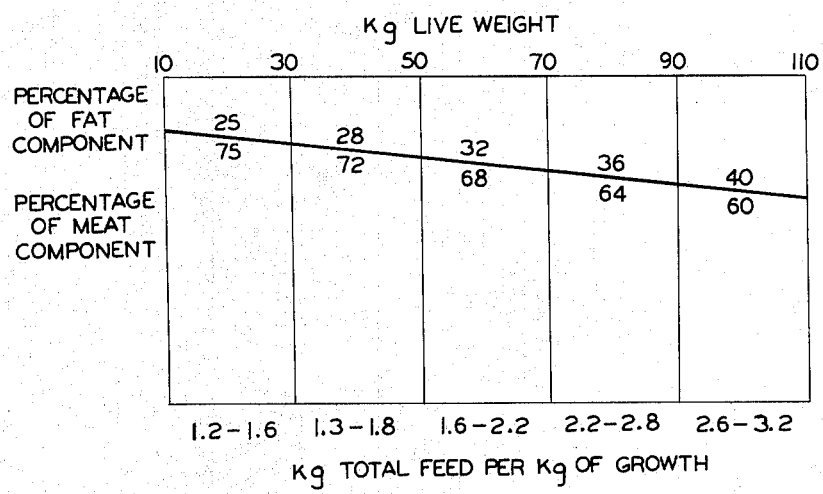

FIGURE 1 indicates the results in force-feeding according to the conventional manner, while FIGURE 2 indicates the results in force-feeding when applying the feed additive according to the invention at a ratio of rennet to calcium chloride of 1 to 5. A comparison between the two graphs indicates clearly the difference which is attained in the consumption of feed and in the formation of meat and fat, respectively.

FIGURE 1 indicates the total consumption of feed for producing an increase of 100 kg. in live weight as amounting to about 350 kg. of feed or fodder with a total of about 0.7 kg. of nutritive substances per kg. of feed comprising about 15% of protein and 55% of carbohydrates.

The total requirements are as follows: protein about 50 kg., carbohydrates 195 kg.

|  | Protein (kg.) | Carbohydrates (kg.) |
| --- | --- | --- |
| For maintaining the health and energy of the animal for 150 days— |  |  |
| 50 kg. of meat require | ca. 13 | ca. 95 |
| 50 kg. of fat require | ca. 17 | ca. 100 |
| Total | 30 | 195 |

The loss is therefore 20 kg.=40%, which means a 60% utilization of the protein.

FIGURE 2 indicates the total consumption of feed for producing an increase of 100 kg. in live weight as amounting to about 2.2 to 2.5 kg. of nutritive substances per kg. of feed, that is, 225 kg. of total feed, likewise with a total of about 700 g. of nutritive substances per kg. of feed and 120 g. of activated rennet powder per 100 kg. of feed. The contents in protein are about 17% and in carbohydrates about 55%. These contents vary in the different mixtures.

The total requirements are as follows: protein about 38 kg., carbohydrates about 123 kg.

|  | Protein (kg.) | Carbohydrates (kg.) |
| --- | --- | --- |
| For maintaining the health and energy of the animal for 120 days— |  |  |
| 70 kg. of meat require | ca. 11 | ca. 84 |
| 30 kg. of fat require | ca. 23 | ca. 60 |
| Total | ca. 34 | ca. 144 |

The loss is therefore about 4 kg., that is, a loss which is unavoidable in the body of the animal because of the loss in urea and in albumin in the faeces.

The total utilization of protein therefore amounts to 90% as compared with 60% according to graph in FIGURE 1.

The results of the tests according to the graphs were attained on about 600 hogs.

The force feed requires in favorable cases 150 days, while in unfavorable cases it may require 200 days or more. The desired aim of the force feed was in some cases attained even in 120 days and under very favorable conditions in as little as 105 to 110 days.

Fodder mixtures for the force feed of hogs are composed primarily of different kinds of grain, Indian corn, afterproducts of milling, corn processing and starch manufacture, and in addition of albumin carriers of an animal type which, however, are usually required to contain only about 15% or 10% when applied to ready-made feed supplied by the feed industry. Such manufactured mixtures usually have a lack in albumin carriers which results in a delay in the force feeding and in the formation of too much fat components. For this reason, it is extremely important that the use of vegetable albumin carriers be promoted which has so far been sorely neglected.

Furthermore, truck crops serving as starch carriers are applied in force feeding, especially potatoes, beets, turnips, and the like. These starch carriers are especially of interest since the inventive additive activates them very effectively. The application of concentrated feed mixtures is thus of special importance.

When feeding truck crops, the concentrated feed should contain a protein component (carriers of animal albumin) of 25%.

Although my invention has been illustrated and described with reference to the preferred embodiments thereof, I wish to have it understood that it is in no way limited to the details of such embodiments, but is capable of numerous modifications within the scope of the appended claim.

Having thus fully disclosed my invention, what I claim is:

An animal feed comprising proteins and carbohydrates as the principal ingredients and as a growth accelerating additive 0.05 to about 0.2 percent by weight of a mixture comprising rennet and calcium chloride in the ratio of about 1:5.

References Cited by the Examiner

UNITED STATES PATENTS

| 1,725,969 | 8/1929 | Robinson | 99—9 |
| 2,465,905 | 3/1949 | Meade et al. | 99—9 |
| 2,906,621 | 9/1959 | Catron. | |

FOREIGN PATENTS

| 575,839 | 5/1959 | Canada. |
| 869,202 | 5/1961 | Great Britain. |
| 18,479 | 7/1904 | Sweden. |

OTHER REFERENCES

"Feedstuffs," May 13, 1961, page 45.

A. LOUIS MONACELL, *Primary Examiner.*

BEATRICE H. STRIZAK, *Examiner.*